(12) United States Patent
Andersen

(10) Patent No.: US 6,990,564 B2
(45) Date of Patent: *Jan. 24, 2006

(54) METHOD AND APPARATUS FOR SEGMENTING MEMORY BASED UPON BANDWIDTH OF A DATA COMMUNICATION PLATFORM

(75) Inventor: Erik Andersen, Broenshoej (DK)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/354,637

(22) Filed: Jan. 29, 2003

(65) Prior Publication Data

US 2003/0115419 A1 Jun. 19, 2003

Related U.S. Application Data

(63) Continuation of application No. 09/607,666, filed on Jun. 30, 2000, now Pat. No. 6,542,977.

(51) Int. Cl.
*G06F 12/02* (2006.01)

(52) U.S. Cl. ...................... 711/170; 711/153
(58) Field of Classification Search ............. 711/100, 711/118, 129, 130, 147, 149, 153, 154, 170; 712/28

See application file for complete search history.

(56) References Cited

U.S. PATENT DOCUMENTS

| | | | |
|---|---|---|---|
| 4,905,141 A | 2/1990 | Brenza | |
| 5,357,623 A | 10/1994 | Megory-Cohen | |
| 5,537,635 A | 7/1996 | Douglas | |
| 5,584,017 A | 12/1996 | Pierce et al. | |
| 5,875,464 A | 2/1999 | Kirk | |
| 6,006,318 A | 12/1999 | Hansen et al. | |
| 6,026,475 A | 2/2000 | Woodman | |
| 6,094,396 A | 7/2000 | Zheng | |
| 6,240,525 B1 | 5/2001 | Chiang | |

*Primary Examiner*—Tuan V. Thai
(74) *Attorney, Agent, or Firm*—Kerry D. Tweet

(57) ABSTRACT

A method and apparatus for combining cost effectiveness of data signal ports sharing a common memory storage device with reliable data signal communication of data signal ports each having a dedicated memory storage device. In one embodiment, data signals are received at a number of data signal ports of a data signal communication platform. A data signal bandwidth capability of a memory storage device of the data communication platform is determined. Once the data signal bandwidth capability of the memory storage device is determined, the memory storage device is segmented to improve utilization of the data signal bandwidth capability. As a result, cost effectiveness of data signal ports sharing a common memory storage device and reliability of data signal communication of data signal ports each having a dedicated memory storage device is combined.

40 Claims, 3 Drawing Sheets

METHOD AND APPARATUS FOR SEGMENTING MEMORY BASED UPON BANDWIDTH OF A DATA COMMUNICATION PLATFORM

This application is a continuation of application Ser. No. 09/607,666, filed Jun. 30, 2000, now U.S. Pat. No. 6,542,977.

FIELD OF THE INVENTION

The present invention pertains to the field of electronic devices. More particularly, this invention relates to network communications.

BACKGROUND

As more computer devices are networked, communication between the computer devices have become faster. Faster communication involves transmitting and receiving large amounts of data signals between networked devices. Often, the rate at which the data signals are received, processed, and transmitted may determine the speed of the communication.

The data communication platform may be implemented in application specific integrated circuits (ASICs). Data signal ports are incorporated into the data communication platform through which the data signals are received and transmitted. Each data signal port may be both an input port and an output port, and therefore, two data signal ports could possibly receive and transmit data signals as four input/output pairs. Through these data signal ports, data signals are received, processed by the data communication platform, and the data signals are transmitted to their destination. The processing of the data signals by the data communication platform is commonly known as switching, and therefore, one example of a data communication platform implemented in ASICs is an ethernet switch engine.

The data communication platform usually includes a limited number of data signal ports. Often times, the data signal ports may receive data signals while the data signal ports to transmit the data signals to their destinations are occupied, thereby causing a "traffic jam" within the data communication platform. In order to control this "traffic jam" of data signals from preventing communication of the data signals, the data signals are temporarily stored in a memory storage device included with the data communication platform.

The memory storage device, for example, a dynamic random access memory (DRAM) device, may be used as a buffer, i.e., the data signals are temporarily stored in the memory storage device until a data signal port for transmission of the data signal is free to transmit the data signals to their destinations. A measure of the rate at which data signals are deposited and retrieved from the memory storage device may be known as a data signal bandwidth, an access rate of the memory storage device.

Commonly, there are two methods for implementing data communication platforms. One method employs the use of a shared memory storage device, where one memory storage device is utilized by a number of data signal ports of the data communication platform. This method relies on the fact that all of the data signal ports might not be active in receiving and transmitting data signals at the same time. The shared memory storage device is cost effective, but if at some point, all of the data signal ports are active, the memory storage device will not have enough capacity to accommodate all of the data signals being received and transmitted by the data communication platform because the memory storage devices are of a limited capacity as part of the cost effectiveness. Some data signals may be lost or sent back to the sender causing unreliable data signal communication.

Another method employs the use of a dedicated memory storage device for each data signal port. This method provides reliable data signal communication because each memory storage device will have enough capacity to accommodate receiving and transmitting the data signal at each data signal port. However, depending upon the number of data signal ports, this method will require a large amount of memory because each data signal port would have its own dedicated memory storage device dedicated to the data signal port. Additionally, the dedicated memory storage device method is not as cost effective as the shared memory storage device method because if the any of the data signal ports are inactive, the memory storage device would not be utilized for those inactive data signal port.

BRIEF DESCRIPTION OF THE DRAWINGS

The present invention is illustrated by way of example and not by way of limitation in the figures of the accompanying drawings, in which the like references indicate similar elements and in which.

DETAILED DESCRIPTION OF THE INVENTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

As discussed more fully below, the present invention provides a method to combine cost effectiveness of data signal ports sharing a common memory storage device with reliable data signal communication of data signal ports each having a dedicated memory storage device.

In general, embodiments of the present invention determines a data signal bandwidth capability for a memory storage device included with a data communication platform, and the memory storage device is segmented to increase utilization of the data signal bandwidth capability of the memory storage device included with the data communication platform.

Figure 1:
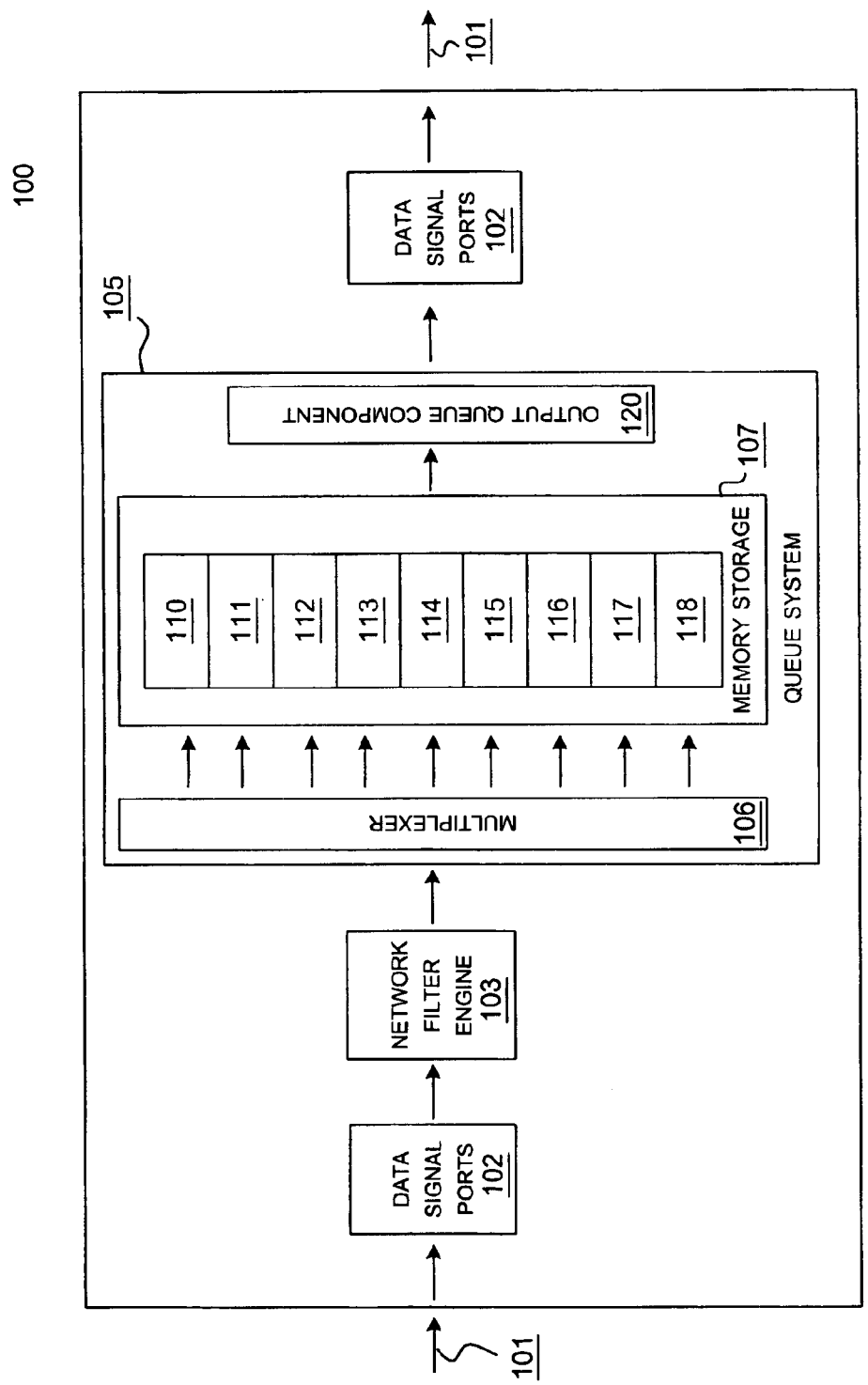
FIG. 1 illustrates a block diagram of one embodiment of the present invention for combining cost effectiveness of data signal ports sharing a common memory storage device with reliable data signal communication of data signal ports each having dedicated memory storage devices.

FIG. 1 illustrates a block diagram of one embodiment of the present invention for combining cost effectiveness of data signal ports sharing a common memory storage device with reliable data signal communication of data signal ports each having dedicated memory storage devices. Shown in FIG. 1 is a data communication platform 100 that receives, processes, and transmits data signals 101. In one embodiment, the data communication platform 100 may be a network switch engine, where the network switch engine may be implemented as application specific integrated circuits (ASICs). It should be appreciated by one skilled in the art that data signals 101 may be in the form of data signal packets, commonly utilized in data communication platforms.

Shown in FIG. 1, data signals are received at the data communication platform 100 by a number of data signal ports 102 functioning to receive the data signals 101. The data signals 101 are then processed by a filter component 103, which may involve determining an origin and a destination of the data signal 101.

In FIG. 1, after being processed in the filter component 103, the data signal 101 is received by a queue system 105. Included with the queue system 105 is a multiplexer 106, a memory storage device 107, a number of segments 110–118 of the memory storage device 107, and an output queue component 120. The multiplexer 106 multiplexes the data signals to each of the number of segments 110–118. The output queue component 120 queues the data signals 101 from the memory storage device 107 for transmission to their destinations (not shown), such as networked computer devices, through the number of data signal ports 120 functioning to transmit the data signals 101. In one embodiment, the memory storage device 107 may be a dynamic random access memory (DRAM) device. Additionally, the memory storage device 107 is a shared memory storage device, where all of the data signal ports 102 share the memory storage device 107.

In one embodiment, the data communication platform 100 may be a network switch engine, in particular, an ethernet switch engine. The number of data signal ports 102 may be twenty four data signal ports, and each data signal port may be capable of a particular data signal communication rate, or commonly known as a particular bit rate, of 1 Gigabit/second.

The memory storage device 107 has a random access cycle time related to the type of memory storage device. A data signal bandwidth capability of the memory storage device 107 is determined from the random access cycle time of the memory storage device 107. The data signal bandwidth capability may be a rate at which there may be more data signals 101 going into the memory storage device 107 than data signals 101 leaving. This situation may cause unreliable data signal communication through the data communication platform 100.

The memory storage device 107 receives data signals at a cell rate, where the cell may be a manner in which packets are divided according to a particular size depending on a network technology. The cell rate is related to the number of data signal ports 102, the data signal communication rate of the data signal ports 102, and a size of the data signals or data signal packet sizes, received by the memory storage device 107. The cell rate determines a rate at which data signals 101 are received by the data communication platform 100 for receiving, processing, and transmitting the data signals 101 to their destinations.

As shown in FIG. 1, in one embodiment, the memory storage device 107 is segmented into segments 110–118. The number of segments 110–118 may be determined by determining the data signal bandwidth capability for the memory storage device 107 and determining the cell rate received by the memory storage device 107 as described above. The memory storage device 107 is segmented so that each of the segments 110–118 have a data signal bandwidth capability substantially similar to the data signal bandwidth capability of the memory storage device 107. However, each of the segments 110–118 is dedicated to a particular number of data signal ports 102 at any given time, as illustrated in a chart below.

CHART 1

| INPUT PORT | OUTPUT PORT | | |
|---|---|---|---|
| | 0–7 | 8–15 | 16–23 |
| 0–7 | Segment 110 | Segment 111 | Segment 112 |
| 8–15 | Segment 113 | Segment 114 | Segment 115 |
| 16–23 | Segment 116 | Segment 117 | Segment 118 |

In Chart 1, twenty four data signal ports are utilized to receive and transmit data signals 101 by the data communication platform 100. The data signal ports 102 may be either operating to receive data signals 101 (input ports) or transmit data signals 101 (output ports). As shown in Chart 1, each of the segments 110–118 is dedicated to a particular number of data signal ports. In one embodiment, each segment 110–118 is dedicated to eight data signal ports operating as input ports and eight data signal ports operating as output ports out of a total of twenty four data signal ports, and therefore, the twenty four data signal ports are utilized in three pairs of eight. However, each segment 110–118 has substantially similar data signal bandwidth capability as the memory storage device 107, as discussed above. A segmented memory storage device, in particular, a memory storage device shared by a number of data signal ports, increases utilization of the data signal bandwidth capability of the memory storage device by reducing the number of data signal ports supported by the data signal bandwidth capability of the memory storage device.

As a result, determining a data signal bandwidth capability of a memory storage device of a data communication platform and segmenting the memory storage device to increase utilization of the data signal bandwidth capability combines cost effectiveness of data signal ports sharing a common memory storage device with reliable data signal communication of data signal ports each having a dedicated memory storage device.

An example of one embodiment for segmenting a memory storage device, in particular, a memory storage device shared by a number of data signal ports, increasing utilization of the data signal bandwidth capability of the memory storage device by reducing the number of data signal ports supported by the data signal bandwidth capability of the memory storage device is as follows:

Number of bits per byte:

8 bits/byte

Data communication platform with number of data signal ports:

24 data signal port ethernet switch engine implemented as ASICs

Bit rate of each data signal port:

1 Gigabits/second ($1 \times 10^9$ bits/second)

Particular number of required cells based on an ethernet frame (packet) size to minimize the number of bytes required by the cells:

cell size $\geq$ 148 bytes

Particular minimum data signal packet size:

64 bytes

Preamble of data signal packet size:

8 bytes

Inter-frame gap of data signal packet size:

12 bytes

Memory storage device:

Imbedded DRAM in ASICs

Particular random access time:

30 nanoseconds ($30 \times 10^{-9}$ seconds)

> Data signal bandwidth capability for particular DRAM (depended on the particular memory storage device technology): (Particular random access time)$^{-1}$=$1/(30 \times 10^{-9})$=$33 \times 10^6$ cells/second  Relationship 1

> Data signal packet size: (particular minimum data signal packet size)+(preamble of data signal packet size)+(Inter-frame gap of data signal packet size)=(64 bytes)+(8 bytes)+(12 bytes)=84 bytes  Relationship 2

Cells received by the memory storage device rate:

$$\frac{(\text{number of data signal ports})(\text{bit rate for each data signal port})}{(\text{number of bits per byte})(\text{data signal packet size})} =$$

$$\frac{(24)(1 \times 10^9 \text{ bits/sec})}{(8 \text{ bits/byte})(84 \text{ bytes})} = 35.7 \times 10^6 \text{ cells/second}$$

Relationship 3

> Data signal bandwidth capability for read/write into the memory storage device: twice the transaction (reading and writing) cells received by the memory storage device rate=(2)($35.7 \times 10^6$ cells/second)=$71.4 \times 10^6$ cells/second  Relationship 4

As shown in the example embodiment, the determination of the data signal bandwidth for read/write into the memory storage device (Rel. 4) is larger than the determination of the data signal bandwidth capability for particular DRAM (Rel. 1). This may cause the memory storage device to receive more data signals than the memory storage device can transmit, thereby data signals may be either lost or the data communication by the data communication may be unreliable.

However, referring back to Chart 1 and FIG. 1, the memory storage device 107 is segmented into nine segments 110–118. Applying Rel. 3 to the segmented memory storage device 107 results in the following determination:

$$\frac{[((\text{number of data signal ports})/(\text{number of input/output data signal port pairs}))(\text{bit rate for each data signal port})]}{[(\text{number of bits per byte})(\text{data signal packet size})]} =$$

Determination 1

$$\frac{((24/(3))(1 \times 10^9 \text{bits/second})}{(8 \text{ bits/byte})(84 \text{ bytes})} = 11.9 \times 10^6 \text{cells/second}$$

In order to determine the data signal bandwidth capability for read/write into the memory storage device with the segments, Rel 4 is applied as follows:

> twice the transaction (reading and writing) cells received by the memory storage device rate=(2)($11.9 \times 10^6$ cells/second)=$23.8 \times 10^6$ cells/second  Determination 2

Because the memory storage device 107 is segmented, the data signal bandwidth capability of $23.8 \times 10^6$ cells/second (Det. 1) of each segment 110–118 is less than $33 \times 10^6$ cell/second (Rel. 1), the data signal bandwidth capability for the memory storage device, DRAM. As a result of the segmented memory storage device, even though all of the data signal ports may be utilized, the utilization of the data signal bandwidth capability of the memory storage device shared by the data signal ports is improved.

Thus in the example embodiment, determining a data signal bandwidth capability of a memory storage device of a data communication platform and segmenting the memory storage device to increase utilization of the data signal bandwidth capability combines cost effectiveness of data signal ports sharing a common memory storage device with reliable data signal communication of data signal ports each having a dedicated memory storage device.

Figure 2:
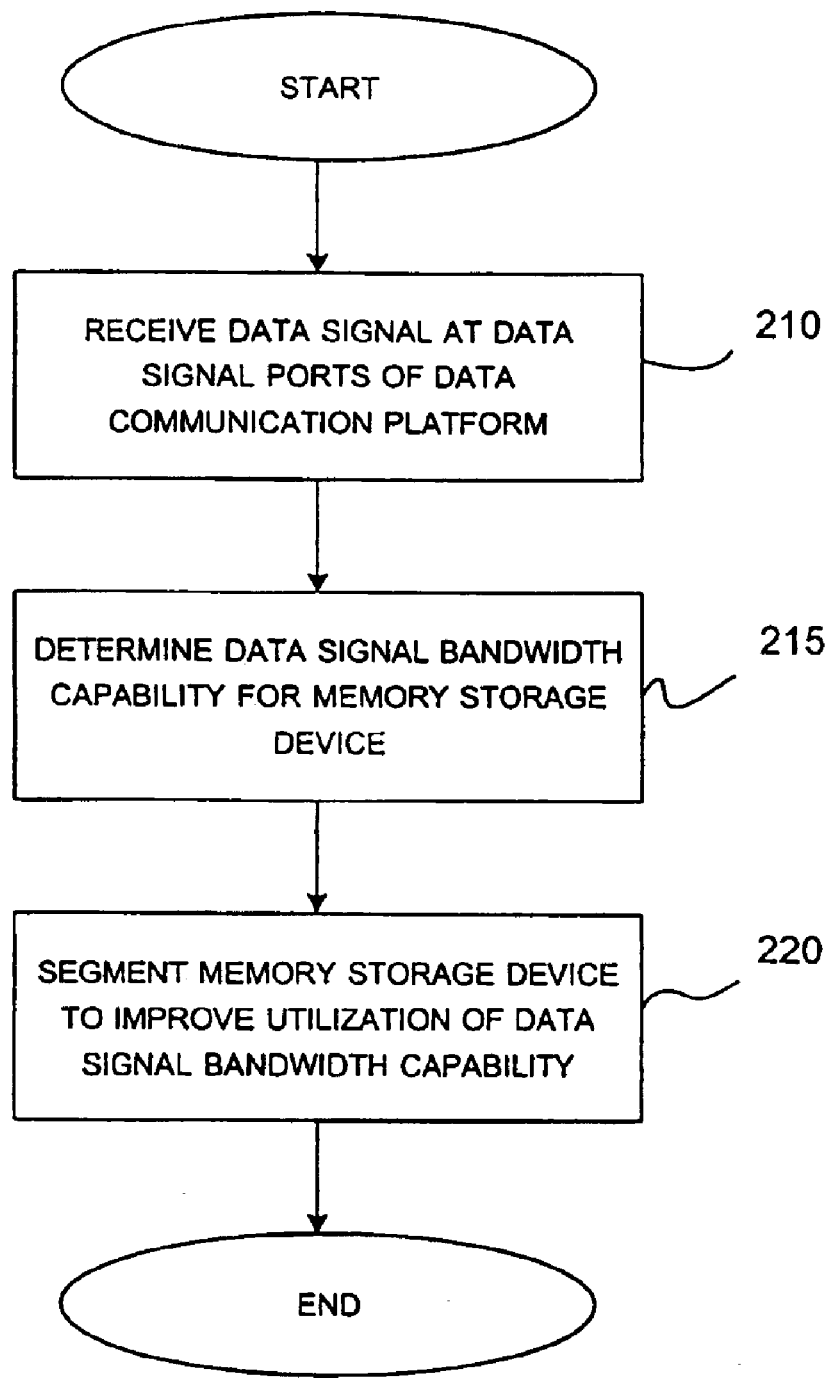
FIG. 2 illustrates an operational flow of one embodiment of the present invention.

FIG. 2 illustrates an operational flow of one embodiment of the present invention. In FIG. 2 data signals are received at a number of data signal ports of a data communication platform, 210. A data signal bandwidth capability for a memory storage device of the data communication platform is determined, 215. Once the data signal bandwidth capability for the memory storage device of the data communication platform is determined, the memory storage device is segmented to improve the utilization of the data signal bandwidth capability of the memory storage device, 220. Accordingly, the operational flow of FIG. 2 provides a method to combine cost effectiveness of data signal ports sharing a common memory storage device with reliable data signal communication of data signal ports each having a dedicated memory storage device in accordance with the present invention.

Figure 3:
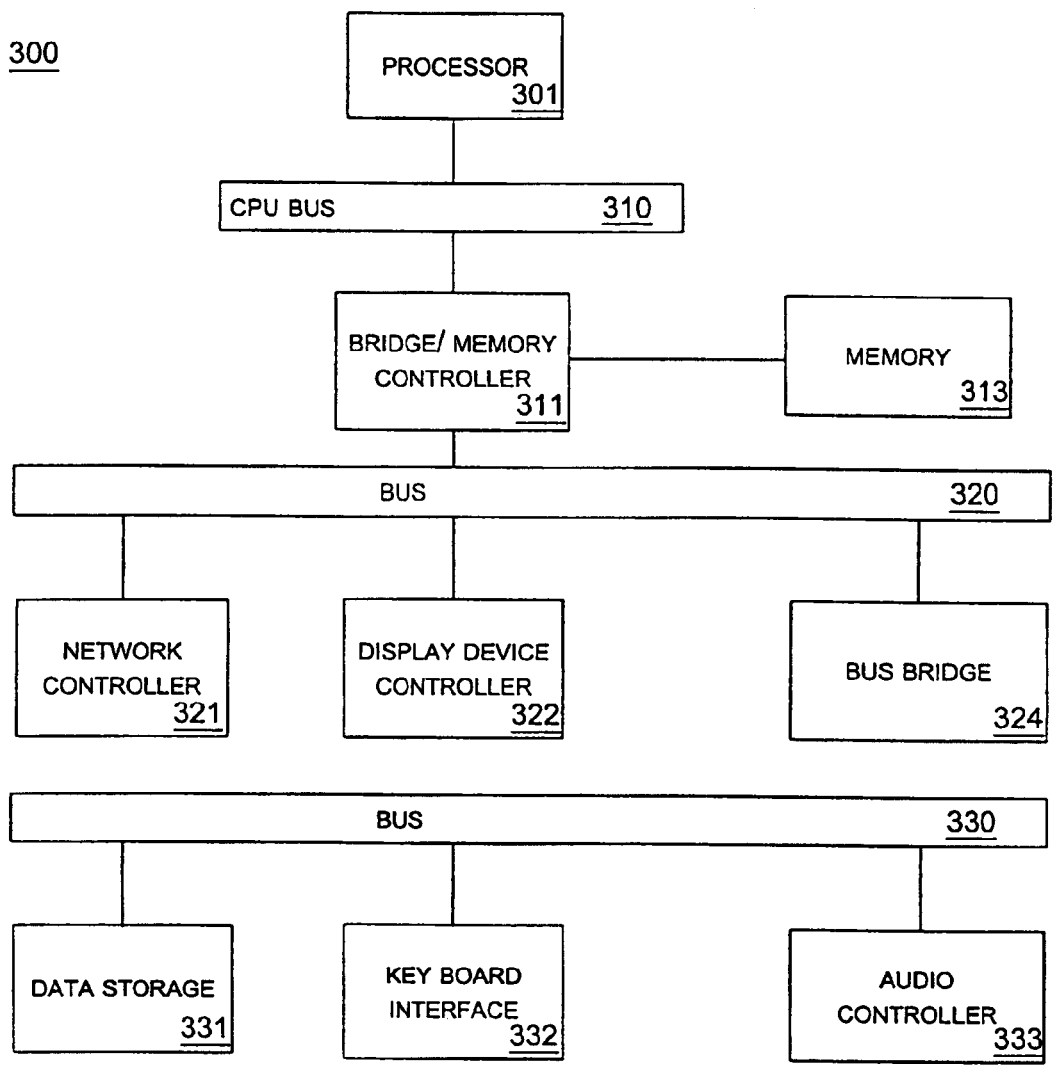
FIG. 3 illustrates a computer system upon which an embodiment of the present invention can be implemented.

FIG. 3 illustrates a computer system 300 upon which an embodiment of the present invention can be implemented. The computer system 300 includes a processor 301 that processes data signals. The processor 301 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 3 shows an example of the present invention implemented on a single processor computer system 300. However, it is understood that the present invention may be implemented in a computer system having multiple processors. The processor 301 is coupled to a CPU bus 310 that transmits data signals between processor 301 and other components in the computer system 300.

The computer system 300 includes a memory 313. The memory 313 may be a dynamic random access memory (DRAM) device, a synchronous direct random access memory (SDRAM) device, or other memory device. The memory 313 may store instructions and code represented by data signals that may be executed by the processor 301.

A bridge/memory controller 311 is coupled to the CPU bus 310 and the memory 313. The bridge/memory controller 311 directs data signals between the processor 301, the memory 313, and other components in the computer system 300 and bridges the data signals between the CPU bus 310, the memory 313, and a first I/O bus 320.

The first I/O bus 320 may be a single bus or a combination of multiple buses. As an example, the first I/O bus 320 may comprise a Peripheral Component Interconnect (PCI) bus, a Personal Computer Memory Card International Association (PCMCIA) bus, a NuBus, or other buses. The first I/O bus 320 provides communication links between components in the computer system 300. A network controller 321 is coupled to the first I/O bus 320. The network controller 321 links the computer system 300 to a network of computers (not shown) and supports communication among the machines. A display device controller 322 is coupled to the first I/O bus 320. The display device controller 322 allows coupling of a display device (not shown) to the computer system 300 and acts as an interface between the display device and the computer system 300. The display device controller 322 may be a monochrome display adapter (MDA) card, a color graphics adapter (CGA) card, an enhanced graphics adapter (EGA) card, an extended graphics array (XGA) card or other display device controller. The display device (not shown) may be a television set, a computer monitor, a flat panel display or other display device. The display device receives data signals from the processor 301 through the display device controller 322 and displays the information and data signals to the user of the computer system 300.

A second I/O bus 330 may be a single bus or a combination of multiple buses. As an example, the second I/O bus 330 may comprise a PCI bus, a PCMCIA bus, a NuBus, an Industry Standard Architecture (ISA) bus, or other buses. The second I/O bus 330 provides communication links between components in the computer system 300. A data storage device 331 is coupled to the second I/O bus 330. The data storage device 331 may be a hard disk drive, a floppy disk drive, a CD-ROM device, a flash memory device or other mass storage device. A keyboard interface 332 is coupled to the second I/O bus 330. The keyboard interface 332 may be a keyboard controller or other keyboard interface. The keyboard interface 332 may be a dedicated device or can reside in another device such as a bus controller or other controller. The keyboard interface 332 allows coupling of a keyboard (not shown) to the computer system 300 and transmits data signals from a keyboard to the computer system 300. An audio controller 333 is coupled to the second I/O bus 330. The audio controller 333 operates to coordinate the recording and playing of sounds.

A bus bridge 324 couples the first I/O bus 320 to the second I/O bus 330. The bus bridge 324 operates to buffer and bridge data signals between the first I/O bus 320 and the second I/O bus 330.

In one embodiment, the data communication platform is implemented as network controller 321 to link the computer system 300 to a network of computer devices (not shown). The data communication platform combining cost effectiveness of data signal ports sharing a common memory storage device with reliable data signal communication of data signal ports each having a dedicated memory storage device.

Thus, a method and apparatus for combining cost effectiveness of data signal ports sharing a common memory storage device with reliable data signal communication of data signal ports each having a dedicated memory storage device is described.

Whereas many alterations and modifications of the present invention will be comprehended by one skilled in the art after having read the foregoing description, it is to be understood that the particular embodiments shown and described by way of illustration are in no way intended to be considered limiting. Therefore, references to details for particular embodiments are not intended to limit the scope of the claims.

What is claimed is:

1. A method comprising:

determining a signal bandwidth capability of a memory, the memory coupled with a plurality of signal ports; and segmenting the memory into a number of segments, at least a portion of the segments each having a signal bandwidth capability substantially similar to the signal bandwidth capability of the memory.

2. The method of claim 1, wherein at least some of the segments are each associated with a subset of the signal ports, each subset including a number of the signal ports.

3. The method of claim 2, further comprising:

receiving a signal at one of the signal ports, the signal including data; and storing at least some of the data in the segment of the memory associated with the one signal port.

4. The method of claim 3, further comprising:

accessing the data stored in the associated segment of the memory; and transmitting the stored data.

5. The method of claim 1, wherein segmenting the memory comprises segmenting the memory based upon one or more of a cell rate, a packet size, a bit rate of the plurality of the plurality of signal ports, a total number of the plurality of signal ports, and the signal bandwidth capability of the memory.

6. The method of claim 1, wherein the signal bandwidth capability of the memory corresponds to an access rate of the memory.

7. An apparatus comprising:

a plurality of signal ports;

a memory coupled with the plurality of signal ports, the memory segmented into a number of segments, at least a portion of the segments each having a signal bandwidth capability substantially similar to a signal bandwidth capability of the memory; and a multiplexer to multiplex received data into the number of segments.

8. The apparatus of claim 7, wherein at lease some of the segments are each associated with a subset of the signal ports, each subset including a number of the signal ports.

9. The apparatus of claim 7, further comprising a filter coupled with the plurality of signal ports.

10. The apparatus claim 7, further comprising a second memory coupled with the memory, the second memory to store data for transmission.

11. The apparatus of claim 7, wherein the memory comprises a dynamic random access memory (DRAM).

12. The apparatus of claim 7, wherein the plurality of signal ports, the memory, and the multiplexer are disposed on a single integrated circuit chip.

13. A system comprising:
a bus;
a processing device coupled with the bus; and
a network interface coupled with the bus, the network interface including
a plurality of signal ports, and
a memory coupled with the plurality of signal ports, the memory segmented into a number of segments, at least a portion of the segments each having a signal bandwidth capability substantially similar to a signal bandwidth capability of the memory.

14. The system of claim 13, wherein at lease some of the segments are each associated with a subset of the signal ports, each subset including a number of the signal ports.

15. The system of claim 13, wherein the memory comprises a dynamic random access memory (DRAM).

16. The system of claim 13, wherein the network interface comprises a single integrated circuit chip.

17. An article of manufacture comprising:
a machine accessible medium providing content, that when accessed by a machine, causes the machine to determine a signal bandwidth capability of a memory, the memory coupled with a plurality of signal ports; and
segment the memory into a number of segments, at least a portion of the segments each having a signal bandwidth capability substantially similar to the signal bandwidth capability of the memory.

18. The article of manufacture of claim 17, wherein at least some of the segments are each associated with a subset of the signal ports, each subset including a number of the signal ports.

19. The article of manufacture of claim 18, wherein the content, when accessed, further causes the machine to:
receive a signal at one of the signal ports, the signal including data; and
store at least some of the data in the segment of the memory associated with the one signal port.

20. The article of manufacture of claim 19, wherein the content, when accessed, further causes the machine to:
access the data stored in the associated segment of the memory; and transmit the stored data.

21. The article of manufacture of claim 17, wherein to segment the memory, the memory is segmented based upon one or more of a cell rate, a packet size, a bit rate of the plurality of the plurality of signal ports, a total number of the plurality of signal ports, and the signal bandwidth capability of the memory.

22. The article of manufacture of claim 17, wherein the signal bandwidth capability of the memory corresponds to an access rate of the memory.

23. A method comprising:
segmenting a memory into a number of segments, the memory coupled with a plurality of signal ports; and
dedicating each of at least a portion of the segments to at least two of the plurality of signal ports, wherein at least some of the segments each have a signal bandwidth capability substantially similar to a signal bandwidth capability of the memory.

24. The method of claim 23, wherein the signal bandwidth capability of the memory corresponds to an access rate of the memory.

25. The method of claim 23, wherein segmenting the memory comprises segmenting the memory based upon one or more of a cell rate, a packet size, a bit rate of the plurality of the plurality of signal ports, a total number of the plurality of signal ports, and a signal bandwidth capability of the memory.

26. The method of claim 23, further comprising:
receiving a signal at one of the signal ports, the signal including data; and
storing at least some of the data in the segment of the memory dedicated to the one signal port.

27. The method of claim 26, further comprising:
accessing the data stored in the dedicated segment of the memory; and
transmitting the stored data.

28. An apparatus comprising:
a plurality of signal ports;
a memory coupled with the plurality of signal ports, the memory segmented into a number of segments, each of at least a portion of the segments associated with at least two of the plurality of signal ports, wherein at least some of the segments each have a signal bandwidth capability substantially similar to a signal bandwidth capability of the memory; and
a multiplexer to multiplex received data into the number of segments.

29. The apparatus of claim 28, further comprising a filter coupled with the plurality of signal ports.

30. The apparatus of claim 28, further comprising a second memory coupled with the memory, the second memory to store data for transmission.

31. The apparatus of claim 28, wherein the memory comprises a dynamic random access memory (DRAM).

32. The apparatus of claim 28, wherein the plurality of signal ports, the memory, and the multiplexer are disposed on a single integrated circuit chip.

33. A system comprising:
a bus;
a processing device coupled with the bus; and
a network interface coupled with the bus, the network interface including
a plurality of signal ports, and
a memory coupled with the plurality of signal ports, the memory segmented into a number of segments, each of at least a portion of the segments associated with at least two of the plurality of signal ports, wherein at least some of the segments each have a signal bandwidth capability substantially similar to a signal bandwidth capability of the memory.

34. The system of claim 33, wherein the memory comprises a dynamic random access memory (DRAM).

35. The system of claim 33, wherein the network interface comprises a single integrated circuit chip.

36. An article of manufacture comprising:
a machine accessible medium providing content, that when accessed by a machine, causes the machine to segment a memory into a number of segments, the memory coupled with a plurality of signal ports; and
dedicate each of at least a portion of the segments to at least two of the plurality of signal ports, wherein at least some of the segments each have a signal bandwidth capability substantially similar to a signal bandwidth capability of the memory.

37. The article of manufacture of claim 36, wherein the signal bandwidth capability of the memory corresponds to an access rate of the memory.

38. The article of manufacture of claim 36, wherein to segment the memory, the memory is segmented based upon one or more of a cell rate, a packet size, a bit rate of the plurality of the plurality of signal ports, a total number of the plurality of signal ports, and a signal bandwidth capability of the memory.

39. The article of manufacture of claim 36, wherein the content, when accessed, further causes the machine to:
   receive a signal at one of the signal ports, the signal including data; and
   store at least some of the data in the segment of the memory dedicated to the one signal port.

40. The article of manufacture of claim 39, wherein the content, when accessed, further causes the machine to:
   access the data stored in the dedicated segment of the memory; and
   transmit the stored data.

* * * * *